Dec. 2, 1969   H. N. SIEBENBERG ET AL   3,481,737
MATRIX CONSTRUCTION FOR FUEL CELLS
Filed June 29, 1966

INVENTORS,
HENRY N. SIEBENBERG
RICHARD DAVID BREAULT

United States Patent Office 3,481,737
Patented Dec. 2, 1969

3,481,737
MATRIX CONSTRUCTION FOR FUEL CELLS
Henry N. Siebenberg, Silver Spring, Md., and Richard D. Breault, East Hartford, Conn., assignors, by mesne assignments, to Leesona Corporation, Warwick, R.I., a corporation of Massachusetts
Filed June 29, 1966, Ser. No. 561,552
Int. Cl. H01m 27/04
U.S. Cl. 136—86    5 Claims

ABSTRACT OF THE DISCLOSURE

The disclosed electrolyte-retaining matrix is for use in a fuel cell or the like, more specifically to provide ionic conductivity and a gas barrier between the cathode and anode. The composition of the matrix comprises amosite fibers and fiberglass which may be intimately intermixed in an integral structure or arranged in alternating layers of amosite and fiberglass. In the latter arrangement, the amosite layers each have one surface in contact with an electrode and the other surface in contact with the middle layer of fiberglass. Both of the embodiments of the matrix provide superior capillary action, gas barrier characteristics and corrosion resistance as compared to amosite or fiberglass used alone.

---

Figure 1:
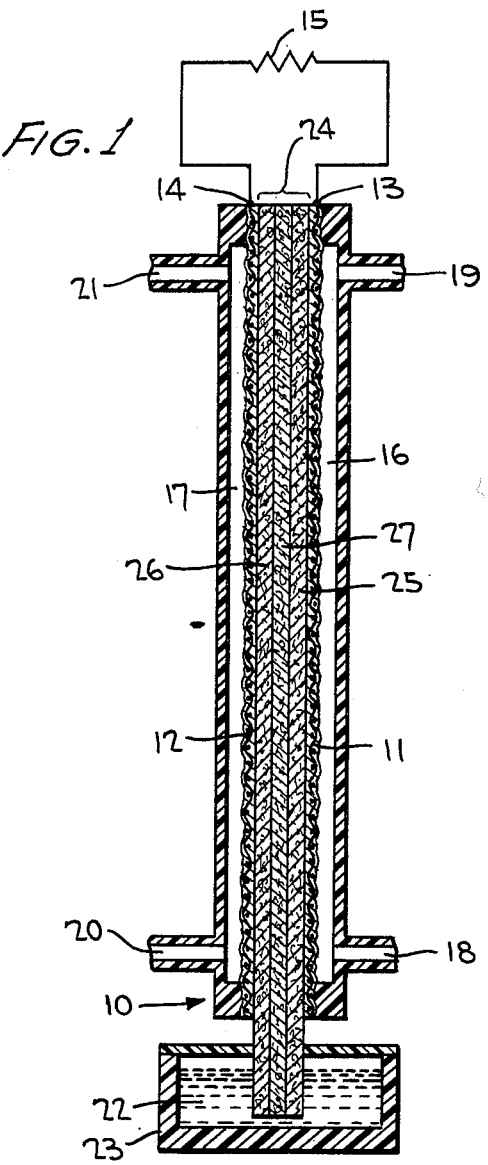

This invention relates to an improved matrix structure and composition for use in electrochemical devices such as fuel cells. More specifically it deals with such matrices which are especially suitable for use in electrochemical devices employing basic electrolytes. For convenience, the invention will be described herein as it relates to fuel cells. It will be understood, however, that the invention is equally applicable to other electrochemical devices, as for instance air batteries.

Fuel cells are electrochemical devices for the direct production of electricity from a fuel and oxidant. By means of such devices chemical energy can be converted directly to electrical energy without the need for first converting this chemical energy into heat and/or mechanical energy.

The function of the matrix in a compact fuel cell is to deliver electrolyte to, and to remove water formed in the electrochemical reaction from, the zone between an adjacent anode and cathode. The matrix accomplishes this transportation of liquids by capillary action, i.e. wicking.

In electrochemical devices employing gaseous reactants, as for instance fuel cells employing hydrogen as the fuel and oxygen or air as the oxidant, the matrix material must also serve the function of a gas barrier. This is because any reaction of gaseous reactants occurring in the matrix rather than at the electrodes will be chemical rather than electrochemical in nature, and therefore will be productive only of heat and/or mechanical energy, rather than electrical energy and will therefore not contribute to the performance of the cell. Furthermore, the possibility of this direct reaction between hydrogen and oxygen gas is an obvious explosion hazard.

In selecting a material to serve as a matrix in an electrochemical device, its resistance to corrosion under the conditions of operation of the device is another important consideration.

Asbestos is commonly employed as the matrix material in fuel cells. It has excellent resistance to corrosion by the various materials used as electrolytes in fuel cells, and also has good gas barrier properties. However its wicking ability leaves much to be desired. The possibility of the formation of dry spots in the matrix, when asbestos is used for this purpose, is of constant concern during the operation of the fuel cell.

Amosite is a variety of mineral anthophyolite containing a minimum of magnesium which has the physical form of asbestos-like fibers. Amosite has excellent wicking properties, far better than asbestos. Amosite is also highly resistant to corrosion under fuel cell operating conditions, even when highly caustic electrolytes are used. However, amosite leaves something to be desired as a gas barrier.

Fiberglass also has very good wicking properties, almost as good as those of amosite. What is more, fiberglass has good gas barrier characteristics. Unfortunately, however, being made of soft glass it is extremely susceptible to corrosive attack by strongly alkaline materials such as the potassium hydroxide solutions used as basic electrolytes in fuel cells. When fiberglass alone is used as the matrix material in a fuel cell employing a caustic electrolyte, cell operation is found soon to break down due to the corrosive attack upon the fiber structure of the matrix material.

An object of this invention is to provide a matrix structure and composition for use in high performance fuel cells wherein basic electrolytes are employed which has superior electrolyte wicking and retention properties, serves as an excellent gas barrier and will resist corrosive attack during the operation of the fuel cell.

Figure 2:
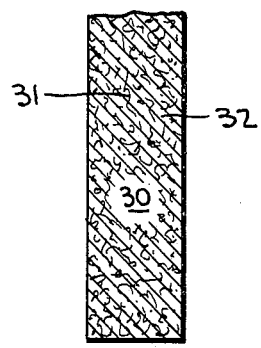

Other objectives of this invention and the manner of their accomplishment will become apparent to those skilled in the art from a consideration of this specification together with the accompanying drawings, in which:

FIGURE 1 is a cross-sectional representation of one type of fuel cell employing a matrix structure of the instant invention; and FIGURE 2 is a schematic cross-sectional representation of a matrix composition of the instant invention to be employed in fuel cells.

It has now been discovered that a matrix structure built up, in cross-section, of fine vertical layers of amosite and fiberglass has essentially the same excellent electrolyte wicking and retention characteristics as amosite, the excellent gas barrier properties of fiberglass, and does not deteriorate in extended service with alkaline electrolytes the way that fiberglass alone will do. In order to achieve optimum results, the outside layers (i.e. the electrode-contacting layers) of the matrix structure should be layers of amosite.

FIGURE 1 illustrates one embodiment of this invention. A single fuel cell 10 is shown in cross-section. Screen electrodes 11 and 12 are electrically connected, at their respective terminals 13 and 14 to an external electrical resistance load 15. Adjacent to the outside surface of each electrode are reactant spaces 16 and 17, respectively. Thus, if electrode 11 is the anode, fuel such as hydrogen is introduced through one of reactant ports 18 or 19, circulated through reactant space 16 where it may be absorbed by the catalyst particles in screen electrode 11, the excess being expelled through the other of reactant ports 18 and 19. Analogously, oxidant, which may be oxygen, air or some other oxidant, is introduced through one of reactant ports 20 and 21 to the space 17, where portions of it are absorbed on the catalyst particles of the screen electrode, the excess being vented through the other of reactant ports 20 and 21. The electrolyte 22 is held in electrolyte reservoir 23 and is raised into contact with the electrode by means of wicking matrix 24. The matrix 24 is a structure of three vertical layers, i.e. a sandwich. The outer, or electrode-contacting layers 25 and 26 are amosite. The central layer is fiberglass. The central fiberglass layer is approximately 10 mils thick. The outside amosite layers are thinner, each being approximately 7½ mils thick.

By way of illustrating the operation of the instant invention, a fuel cell constructed as depicted in FIGURE 1 is operated on hydrogen fuel and oxygen as the oxidant, using a 30 weight percent solution of potassium hydroxide as the electrolyte, for 69 hours at 100° F. No operating difficulties, including those which would result from the development of dry spots, flooding, or gas barrier breakdown, are encountered.

By way of comparison, a single 10 mil-thick layer of fiberglass is substituted as the matrix material in the fuel cell depicted in FIGURE 1. Initial performance of the fuel cell is excellent, possibly slightly better than when the matrix material of the invention is used. After a short period of operation (sometimes as soon as one half hour after start-up), however, performance of the cell deteriorates and the cell becomes inoperative by virtue of a breakdown of the structure of the matrix caused by the attack of the caustic electrolyte upon the fiberglass.

Also by way of comparison, a 30-mil-thick layer of asbestos is substituted as the matrix material in the fuel cell depicted in FIGURE 1. Although this matrix material remains free from attack by the caustic electrolyte for extended periods of time, the performance of the cell is rather poor.

The performance characteristic of the fuel cell described above and depicted in FIGURE 1 and also those of fuel cells with fiberglass substituted as the matrix material and with asbestos substituted as the matrix material are tabulated in accompanying Table I.

TABLE I

| Current density, amps, square foot: | Cell voltage | | |
|---|---|---|---|
| | Matrix, 10 mils fiberglass flanked by 7½ mils amosite as in Fig. 1 | Matrix, 10 mils fiberglass | Matrix 30 mils asbestos |
| 55 | 0.86 | 0.88 | 0.84 |
| 108 | 0.83 | 0.84 | 0.76 |
| 162 | 0.80 | 0.82 | 0.70 |
| 218 | 0.77 | 0.80 | |
| 272 | 0.75 | 0.78 | |
| 324 | 0.72 | 0.75 | |
| 352 | 0.70 | | |
| 368 | | 0.74 | |
| 434 | | 0.72 | |

In another embodiment of this invention, a mixture of fiberglass and amosite is used as the matrix material. This embodiment is depicted in FIGURE 2, wherein the matrix material 30 is seen to comprise fibers of fiberglass 31 intermixed in intimate fashion with fibers of amosite 32. In operation, a fuel cell such as that depicted in FIGURE 1 but with a matrix material of this embodiment of this invention, as depicted in FIGURE 2, will be found to have excellent performance characteristics, excellent wicking properties as indicated by no problems concerning either flooding or the development of dry spots, an absence of problems created by gas barrier breakdown and no deterioration due to corrosive attack. All of these characteristics are found to be substantially the same as when a matrix material employing the layered structure of amosite and fiberglass depicted in FIGURE 1 is used.

We claim:

1. In an electrochemical device for the direct production of electricity from chemical energy comprising a cathode, an anode, an electrolyte disposed between the cathode and the anode, at least one of said anode and cathode being a non-consumable gas absorbing electrode, and means for supplying a reactant to said gas absorbing electrode, the improvement comprising a porous matrix disposed between the cathode and the anode and constructed and arranged to retain the electrolyte, said matrix comprising amosite and fiberglass.

2. The electrochemical device according to claim 1 wherein the matrix comprises an intimate mixture of amosite and fiberglass.

3. An electrochemical device for the direct production of electricity from chemical energy comprising a cathode, an anode, at least one of said anode and cathode being a non-consumable gas absorbing electrode, means for supplying a reactant to said gas absorbing electrode, an electrolyte, and a matrix disposed between the cathode and the anode and constructed and arranged to retain the electrolyte, the said matrix comprising at least two layers comprising amosite, one of the amosite layers being in contact with the cathode and one with the anode, and at least one layer comprising fiberglass.

4. An electrochemical device according to claim 3 wherein the said matrix comprises three vertical layers, the layers in contact with the cathode and the anode comprising amosite and the layer disposed between the two amosite layers comprising fiberglass.

5. An electrochemical device according to claim 4 wherein the said fiberglass layer is not substantially in excess of 10 mils in thickness and the said amosite layers are not substantially in excess of 7½ mils in thickness.

References Cited

UNITED STATES PATENTS

| 2,285,423 | 6/1942 | Esser | 161—152 XR |
| 2,531,504 | 11/1950 | Dillehay et al. | 136—145 |
| 2,687,446 | 8/1954 | Merrill | 136—145 |
| 3,007,841 | 11/1961 | Breiner et al. | 162—145 |
| 3,126,302 | 3/1964 | Drushella | 136—86 |
| 3,132,972 | 5/1964 | Ludwig | 136—86 |
| 3,202,547 | 8/1965 | Rightmire et al. | 136—86 |

FOREIGN PATENTS 6,403,735   10/1964   Netherlands.

WINSTON A. DOUGLAS, Primary Examiner

D. L. WALTON, Assistant Examiner

U.S. Cl. X.R.

136—145, 146, 162